(12) United States Patent
Shen et al.

(10) Patent No.: US 12,736,205 B2
(45) Date of Patent: Sep. 15, 2026

(54) BACKLIGHT MODULE

(71) Applicant: DARWIN PRECISIONS CORPORATION, Hsinchu County (TW)

(72) Inventors: Wen-Tai Shen, Hsinchu County (TW); Ming Chin Tsai, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/443,324

(22) Filed: Feb. 16, 2024

(65) Prior Publication Data

US 2024/0401782 A1 Dec. 5, 2024

(30) Foreign Application Priority Data

May 29, 2023 (TW) ................................ 112119871

(51) Int. Cl.

| | |
|---|---|
| ***F21V 19/00*** | (2006.01) |
| ***F21Y 105/16*** | (2016.01) |
| ***F21Y 115/10*** | (2016.01) |
| ***G02F 1/13357*** | (2006.01) |

(52) U.S. Cl.

CPC ......... *F21V 19/003* (2013.01); *F21Y 2105/16* (2016.08); *F21Y 2115/10* (2016.08); *G02F 1/133603* (2013.01); *G02F 1/133605* (2013.01); *G02F 1/133608* (2013.01)

(58) Field of Classification Search

CPC ............... F21V 19/003; F21Y 2115/10; F21Y 2105/16; G02F 1/133602; G02F 1/133603; G02F 1/133605; G02F 1/133608

See application file for complete search history.

(56) References Cited

U.S. PATENT DOCUMENTS

| | | | | |
|---|---|---|---|---|
| 6,139,334 A | 10/2000 | Forish et al. | | |
| 8,421,958 B2 * | 4/2013 | Zhang | G02F 1/133608 | 362/97.3 |
| 8,807,805 B2 * | 8/2014 | Kuromizu | G02F 1/133604 | 362/310 |

(Continued)

FOREIGN PATENT DOCUMENTS

| | | |
|---|---|---|
| CN | 107884992 A | 4/2018 |
| CN | 112445026 A | 3/2021 |

(Continued)

OTHER PUBLICATIONS

KR 100976133, Aug. 16, 2010, Jong Suck Choi, English Translation (Year: 2010).*

*Primary Examiner* — Jong-Suk (James) Lee
*Assistant Examiner* — James M Endo

(57) ABSTRACT

A backlight module includes a light source module, a reflective element, and a backplate. The light source module is disposed on the backplate and comprises a plurality of light sources and a substrate; the plurality of light sources are arranged in arrays on the substrate. The reflective element is disposed on the light source module and has a plurality of reflective cavities; the plurality of reflective cavities are arranged in arrays, and the plurality of light sources are respectively accommodated in the plurality of reflective cavities. The backplate has a plurality of first fixing holes used for fixing the light source module and the reflective element to the backplate.

12 Claims, 7 Drawing Sheets

(56) References Cited

U.S. PATENT DOCUMENTS 8,827,482 B2 * 9/2014 Yoshikawa ....... G02F 1/133608 362/382
10,371,325 B1 * 8/2019 Yuan ..................... H01L 33/507
10,969,628 B1 * 4/2021 Zweigle ............ G02F 1/133608
12,085,808 B2 * 9/2024 Lee ................... G02F 1/133608
2002/0044437 A1 * 4/2002 Lee ................... G02F 1/133604 362/581
2005/0073858 A1 * 4/2005 Kim ...................... F21V 19/009 362/240
2005/0225960 A1 * 10/2005 Tsai .................. G02F 1/133608 362/23.18
2005/0270795 A1 * 12/2005 Lai .................... G02F 1/133608 362/558
2007/0019419 A1 * 1/2007 Hafuka ............. G02F 1/133603 362/373
2008/0106905 A1 * 5/2008 Zhang ............... G02F 1/133608 362/311.06
2009/0154139 A1 * 6/2009 Shin .................. G02F 1/133608 362/382
2009/0268126 A1 * 10/2009 Son ................... G02F 1/133608 362/235
2010/0208161 A1 * 8/2010 Sasaki ............... G02F 1/133608 362/97.1
2010/0328966 A1 * 12/2010 Shin .................. G02F 1/133605 362/609
2011/0134629 A1 * 6/2011 Kim .................. G02F 1/133608 362/97.1
2011/0310326 A1 * 12/2011 Kitada .............. G02F 1/133608 349/61
2012/0081634 A1 * 4/2012 Yokota .............. G02F 1/133603 362/235
2012/0086884 A1 * 4/2012 Yoshikawa ....... G02F 1/133608 362/382
2012/0287376 A1 * 11/2012 Zhang ............... G02F 1/133608 349/64
2013/0100666 A1 * 4/2013 Matsui .............. G02F 1/133603 362/296.01
2013/0128128 A1 * 5/2013 Ikuta ................. G02F 1/133605 349/67
2013/0201663 A1 * 8/2013 Cho .................. G02F 1/133603 362/355
2013/0314899 A1 * 11/2013 Ye ........................... G09F 13/22 362/97.1
2015/0049280 A1 * 2/2015 Suzuki .............. G02F 1/133611 349/62
2015/0055052 A1 * 2/2015 Tanabe .............. G02F 1/133611 349/58
2016/0223726 A1 * 8/2016 Kwon ............... G02F 1/133308
2016/0238895 A1 * 8/2016 Choi ................. G02F 1/133605
2020/0110311 A1 * 4/2020 Gordon ............. G02F 1/133603
2020/0117056 A1 * 4/2020 Yoon ................. G02F 1/133605
2020/0133073 A1 * 4/2020 Kim .................. G02F 1/133308
2021/0063821 A1 * 3/2021 Chang ............... G02F 1/133605
2021/0200026 A1 * 7/2021 Sonobe ............. G02F 1/133605
2022/0146883 A1 * 5/2022 Zhang ............... G02F 1/133606
2022/0308277 A1 * 9/2022 Du ....................... G02B 6/0091

FOREIGN PATENT DOCUMENTS

KR 100976133 * 8/2010 .......... F21Y 2115/10
TW 200602750 A 1/2006
TW M494938 U 2/2015
TW 202232795 A 8/2022

* cited by examiner

BACKLIGHT MODULE

FIELD OF THE INVENTION

The present invention relates to a backlight module, and in particular to a direct-lit backlight module.

BACKGROUND OF THE INVENTION

In the current direct-lit backlight structure, the LED (Light-Emitting Diode) light board is used as a light source. The light board and the backplate are usually fixed together for fastening; when a reflective cavity element is used in the backlight structure, it is generally placed on the light board and fixed to the light board by the double-sided adhesive or glue. However, the screws used to fix the light board to the backplate interfere with the placement of the reflective cavity element on the light board, making it impossible for the reflective cavity element to be smoothly attached to the light board; if a double-sided adhesive is used to fix the light board to the backplate, the bonding strength is insufficient, leading to detachment.

SUMMARY OF THE INVENTION

The present invention provides a backlight module able to overcome the problem of poor fastening of the reflective element and conducive to alignment and assembly, thus improving the production yield of the backlight module and light emitting quality.

The backlight module provided by the present invention includes a light source module, a reflective element, and a backplate. The light source module is disposed on the backplate and comprises a plurality of light sources and a substrate; the plurality of light sources are arranged in arrays on the substrate. The reflective element is disposed on the light source module and has a plurality of reflective cavities; the plurality of reflective cavities are arranged in arrays, and the plurality of light sources are respectively accommodated in the plurality of reflective cavities. The backplate has a plurality of first fixing holes used for fixing the light source module and the reflective element to the backplate.

In the present invention, a plurality of first fixing holes are used in the backplate, and therefore the backplate, the light source module, and the reflective element are fastened together, saving the fixing steps, and avoiding the interference caused by the screws fixing the light source module and the backplate as well as poor fixing between the reflective element and the light source module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 6 is a schematic three-dimensional diagram of a reflection sheet according to an embodiment of the present invention.

DETAILED DESCRIPTION OF PREFERRED EMBODIMENTS

The foregoing and other technical contents and other features and advantages of the present invention will be clearly presented from the following detailed description of a preferred embodiment in cooperation with the accompanying drawings. Directional terms mentioned in the following examples are only used to describe directions referring to the attached drawings. Therefore, the directional terms used are for illustration and not for limitation. In addition, terms such as "first" and "second" involved in the description or claims are merely used for naming the elements or distinguishing different embodiments or ranges rather than limiting the upper limit or lower limit of the quantity of the elements.

Figure 1:
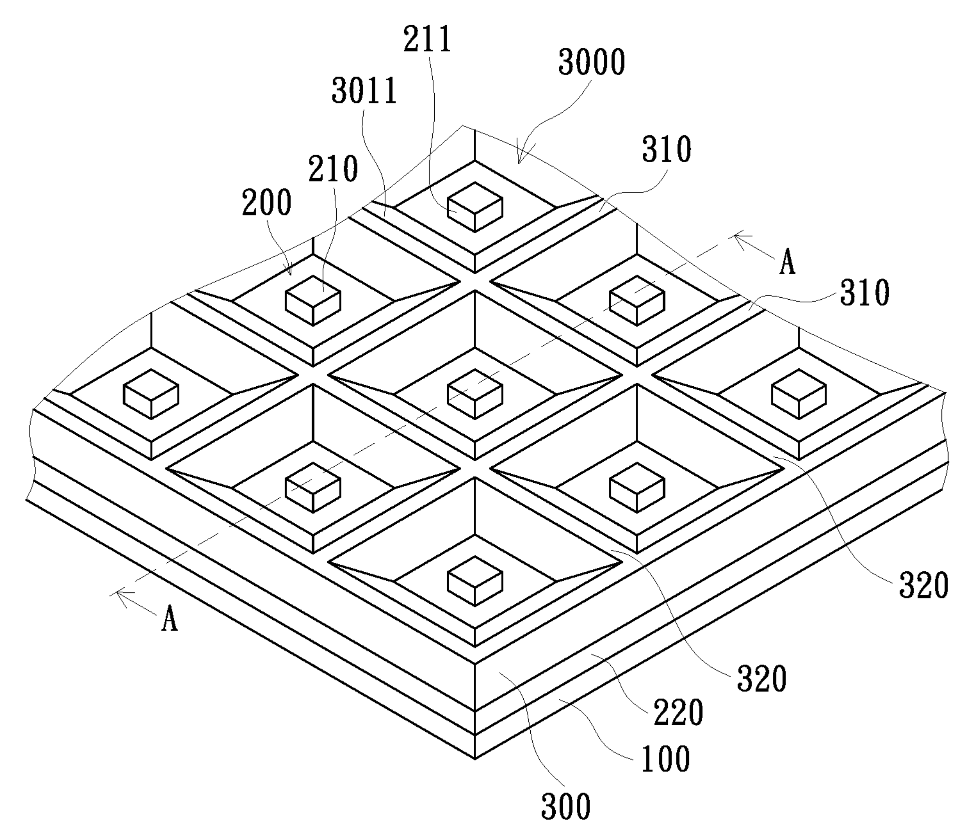
FIG. 1 is a schematic three-dimensional diagram of a backlight module according to a first embodiment of the present invention.
Figure 1:
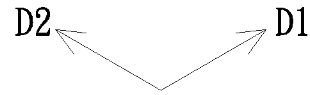
Figure 2:
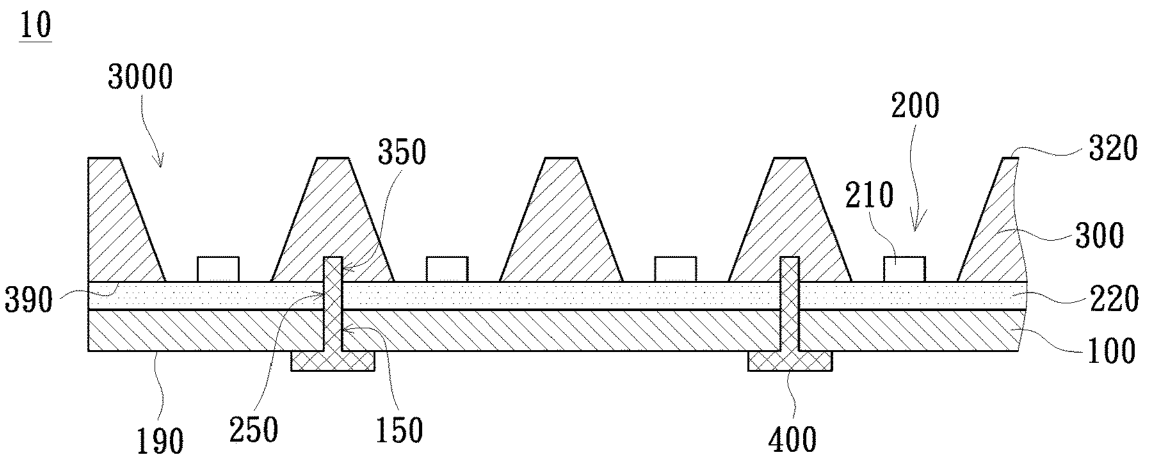
FIG. 2 is a schematic diagram of a cross section along A-A in FIG. 1.
Figure 3:
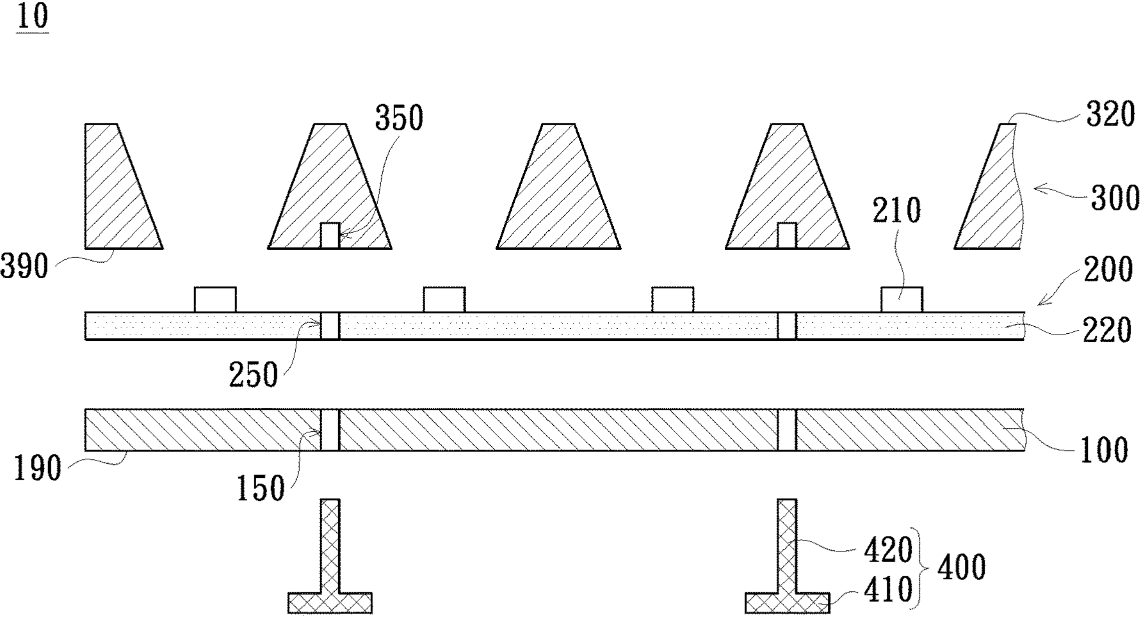
FIG. 3 is a schematic exploded view of FIG. 2.

FIG. 1 is a schematic three-dimensional diagram of a backlight module according to a first embodiment of the present invention. FIG. 2 is a schematic diagram of a cross section along A-A in FIG. 1. FIG. 3 is a schematic exploded view of FIG. 2. In an embodiment of the present invention, as shown in FIGS. 1 to 3, the backlight module 10 comprises a backplate 100, a light source module 200, and a reflective element 300, and the light source module 200 and the reflective element 300 are disposed on the backplate 100. The light source module 200 comprises a plurality of light sources 210 and a substrate 220, and the plurality of light sources 210 are disposed in arrays on the substrate 220. In a preferred embodiment of the present invention, the light source 210 is, for example, a light emitting diode (LED), and more preferably, a sub-millimeter light emitting diode (Mini LED). The substrate 220 can be, for example, a flexible circuit board or a carrier board, and can be configured to drive and control the plurality of light sources 210.

The reflective element 300 is disposed on the light source module 200 and has a plurality of reflective cavities 3000. The plurality of reflective cavities 3000 are arranged in arrays, and the plurality of light sources 210 are respectively accommodated in the plurality of reflective cavities 3000. At least one surface 3011 is provided around each reflective cavity 3000. The surface 3011 can have reflectivity or light-absorbing property, and the light source 210 is provided with at least one light-emitting surface 211 facing the at least one surface 3011. The surface 3011 can regulate the light rays from the light source 210, thereby making the backlight module 10 achieve the desired light emitting effect. In a preferred embodiment of the present invention, the reflective element 300 further comprises a plurality of first walls 310 and a plurality of second walls 320. The plurality of first walls 310 extend in a first direction D1 and are spaced apart in a second direction D2 perpendicular to the first direction D1, and the plurality of second walls 320 extend in the second direction D2 and are spaced apart in the first direction D1. The plurality of first walls 310 and the plurality of second walls 320 can enclose the plurality of reflective cavities 3000. The backlight module 10 can further comprise other optical films such as a diffuser sheet, a beam splitter, and a brightness enhancement film. The optical film can be conventionally disposed above the reflective element 300, which is not described herein again.

In some embodiments of the present invention, four surfaces 3011 are provided around each reflective cavity 3000, and the light source 210 has four light-emitting surfaces 211 respectively facing the four surfaces 3011 of the reflective cavity 3000, but the present invention is not limited thereto. The surface 3011 can be an inclined surface with respect to the substrate 220 or perpendicular to the substrate 220. In other embodiments of the present invention, for example, the surface 3011 of the reflective cavity 3000 can be annular, and the light-emitting surface 211 of the light source 210 can be correspondingly annular. However, the surface 3011 and the light-emitting surface 211 can be different in terms of such as shape and quantity.

The light source module 200 is further fixed to the backplate 100. As shown in FIGS. 2 and 3, the backplate 100 has a plurality of first fixing holes 150 able to fit with fasteners (described in the following), so as to fix the light source module 200 to the backplate 100. In the embodiment of the present invention, the light source module 200 has a plurality of second fixing holes 250 respectively corresponding to the plurality of first fixing holes 150. The backlight module 10 is further provided with a plurality of fasteners 400 respectively passing through each first fixing hole 150 and each second fixing hole 250, and fixing the light source module 200 to the backplate 100. The second fixing hole 250 can be, for example, a through hole formed on the substrate 220, and is preferably located between two adjacent light sources 210.

As shown in FIG. 3, the fastener 400 can comprise a cap portion 410 and a connection portion 420. For example, the fastener 400 can be, for example, a bolt, the connection portion 420 can have a thread, and the first fixing hole 150 and the second fixing hole 250 can be threaded holes. In this case, the fastener 400 can fix the backplate 100 with the light source module 200 from a bottom 190 of the backplate 100; the connection portion 420 extends from the cap portion 410 and passes through the first fixing hole 150 and the second fixing hole 250, and the cap portion 410 abuts against the bottom 190 of the backplate 100. The cap portion 410 enables fixing from the bottom 190 of the backplate 100, and therefore does not cause interference between the light source module 200 and the reflective element 300.

The reflective element 300 can be also fixed to the backplate 100. As shown in FIGS. 2 and 3, the reflective element 300 has a plurality of third fixing holes 350 respectively corresponding to the plurality of second fixing holes 250. The third fixing holes 350 can be, for example, holes formed at a bottom 390 of the reflective element 300. In the embodiments of FIGS. 1 to 3, the third fixing hole 350 is located under the first wall 310, the second wall 320, or a joint therebetween, but the present invention is not limited thereto. The plurality of fasteners 400 can fasten the backplate 100, the light source module 200, and the reflective element 300 from the bottom 190 of the backplate 100; the connection portion 420 extends from the cap portion 410 and can pass through the first fixing hole 150, the second fixing hole 250 and the third fixing hole 350, and the cap portion 410 abuts against the bottom 190 of the backplate 100. Therefore, the light source module 200 and the reflective element 300 do not need to be fixed additionally, but fixed with the backplate 100 together by the fastener 400. For example, the step of disposing a glue to fasten the reflective element 300, the light source module 200, and/or the reflective element 300 can be omitted. The first fixing hole 150, the second fixing hole 250, the third fixing hole 350, and the fastener 400 can be provided with the same quantity. In some embodiments of the present invention, for example, the first fixing hole 150, the second fixing hole 250, the third fixing hole 350, and the fastener 400 are each provided in the quantity of six, and can be arranged at, for example, four corners and the central region of the backlight module 10 for fastening.

Figure 4:
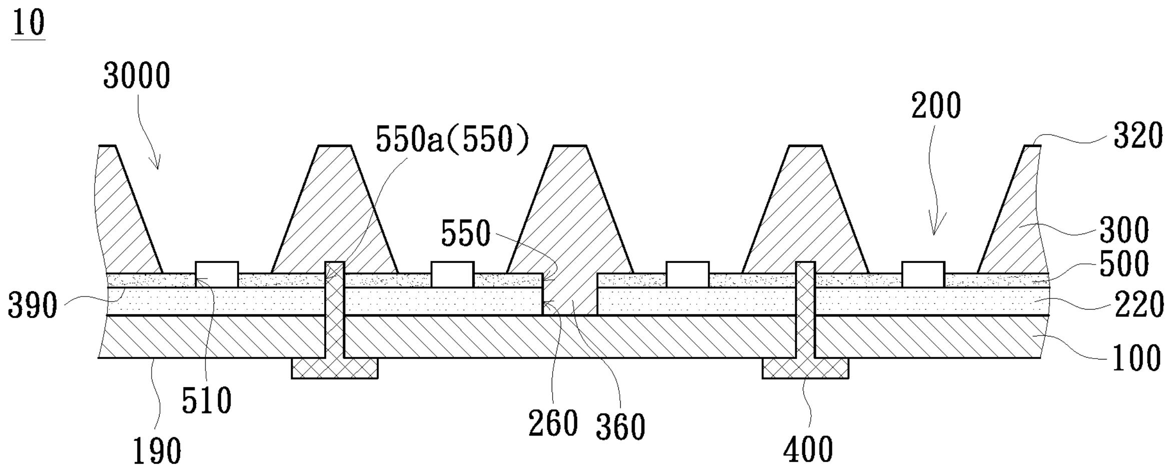
FIG. 4 is a schematic diagram of a cross section of a backlight module according to a second embodiment of the present invention.

The backlight module of the embodiments of the present invention can further be provided with an alignment structure for assembling the backlight module, ensuring the correct relative positions between components such as the light source module, the reflective element, and the backplate. FIG. 4 is a schematic diagram of a cross section of a backlight module according to a second embodiment of the present invention. The second embodiment mainly differs from the first embodiment in that the reflective element 300 further comprises a plurality of positioning elements 360 configured at the bottom 390 (only one is shown in the figure for description). The light source module 200 comprises a plurality of first positioning portions 260 configured on the substrate 220. The plurality of positioning elements 360 can fit with the plurality of first positioning portions 260, so as to determine the relative position between the reflective element 300 and the light source module 200. The fit between the positioning element 360 and the first positioning portion 260 can be, for example, the fit between a mortise-like element and a tenon-like element. In some embodiments of the present invention, the positioning element 360 is of a pillar structure, and can be a pillar body formed integrally and extending from the bottom 390 of the reflective element 300; the first positioning portion 260 can be, for example, a hole, and fits with the pillar body of the positioning element 360. In the embodiment of FIG. 4, the positioning element 360 is located under the first wall 310, the second wall 320, or a joint therebetween, but the present invention is not limited thereto.

Figure 5:
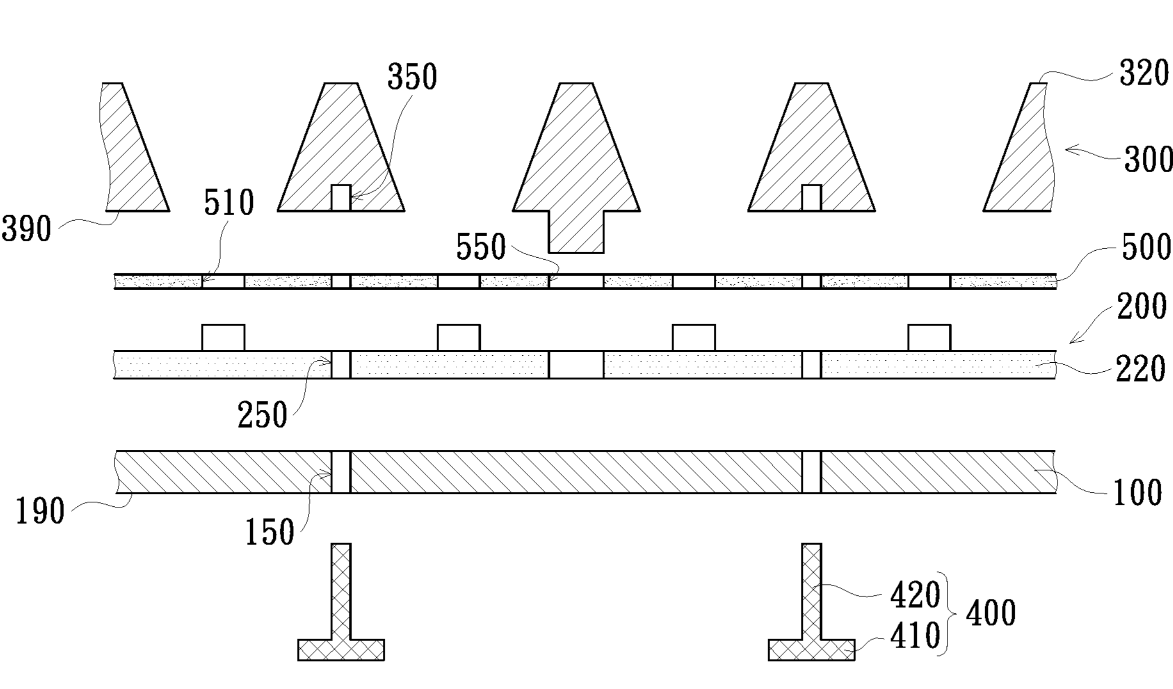
FIG. 5 is a schematic exploded view of FIG. 4.

The backlight module in the embodiments of the present invention can further comprise a reflection sheet. As shown in FIGS. 4 and 5, the reflection sheet 500 is disposed between the reflective element 300 and the light source module 200, and can be used to reflect light rays in a direction from the substrate 220, thus further increasing light use efficiency. The reflection sheet 500 has a plurality of through holes 550 and a plurality of passing holes 510. The plurality of through holes 550 respectively correspond to the plurality of second fixing holes 250, the plurality of positioning elements 360, or a combination thereof. In the embodiments of FIGS. 4 and 5, the through holes 550*a* correspond to the second fixing holes 250, so as to correspond to the first fixing holes 150 and the third fixing holes 350 for the fasteners 400 to pass through. The plurality of passing holes 510 respectively correspond to all or some of the light sources 210, and the plurality of light sources 210 respectively pass through the plurality of passing holes 510.

Figure 6:
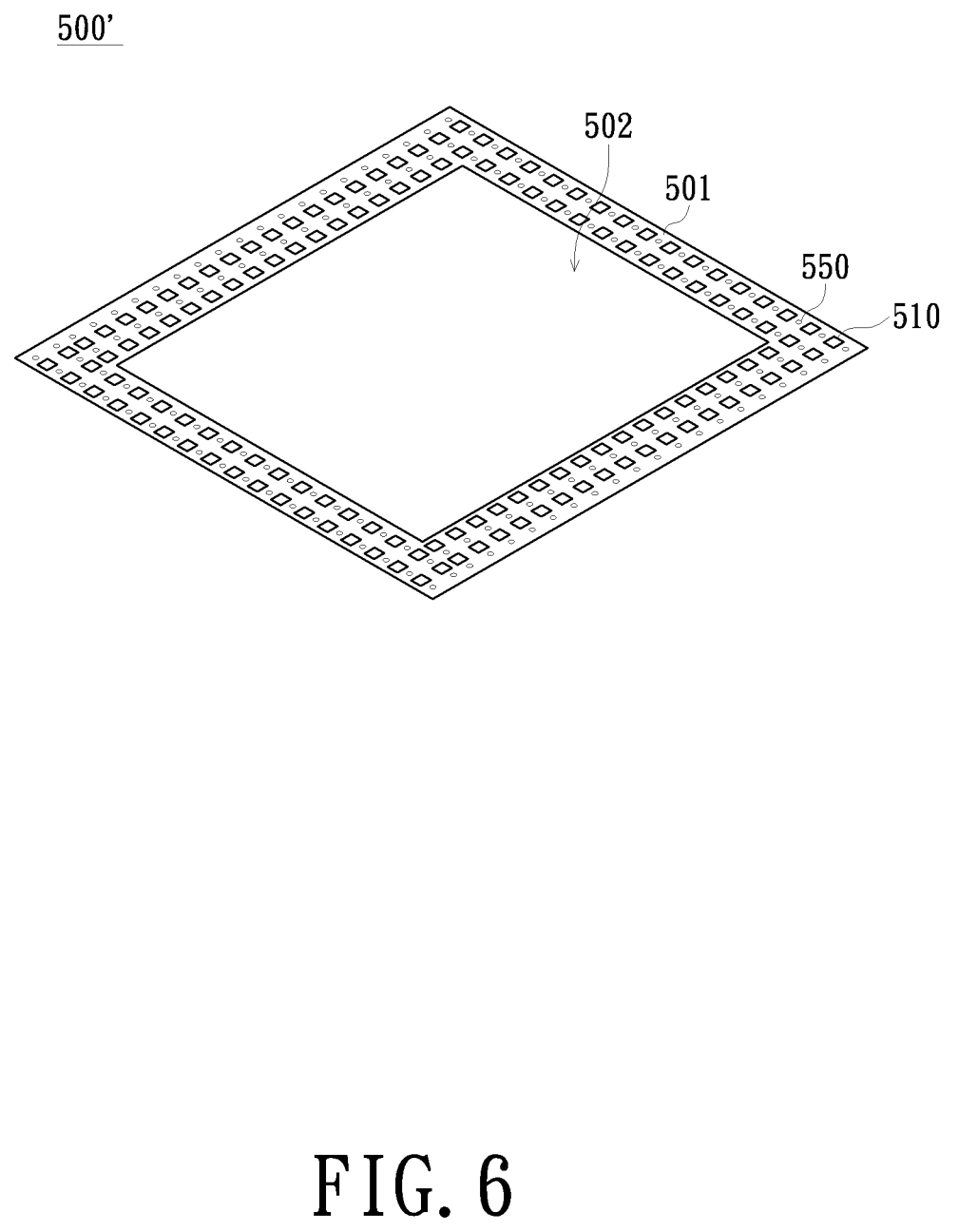

In the embodiments of FIGS. 4 and 5, the reflection sheet 500 is a full-surface reflection sheet configurable on the entire surface of the substrate 220, and all the light sources 210 pass through the plurality of passing holes 510 to enter the reflective cavity 3000. However, in other embodiments, as shown in FIG. 6, the reflection sheet 500' comprises a sheet material region 501 and a hollow region 502. The sheet material region 501 surrounds the hollow region 502 to enable the reflection sheet 500' to be substantially a shape of a square frame. The passing hole 510 is formed in the sheet material region 501. For example, each side of the sheet material region 501 can be provided with, for example, three rows/columns of passing holes 510. The reflection sheet 500' allows the reflective cavity 3000 near the periphery of the light source module 200 to have a reflective material on the substrate 220, thus increasing light use efficiency in a marginal region, which helps to compensate for the lower brightness in other regions than the central region. It can be understood that in addition to this embodiment, the foregoing and following embodiments all can further comprise a reflection sheet 500 or 500'.

Figure 7:
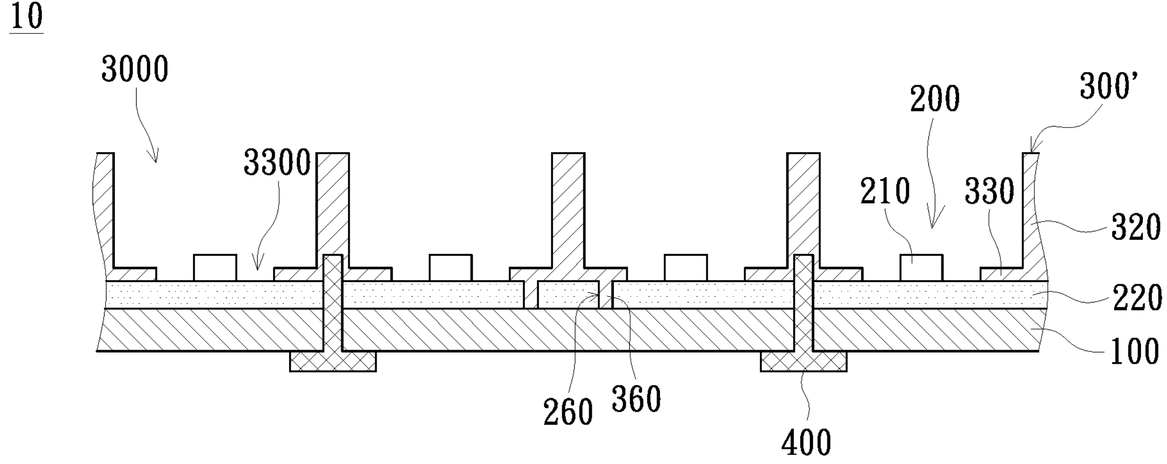
FIG. 7 is a schematic diagram of a cross section of a backlight module according to a third embodiment of the present invention.

FIG. 7 is a schematic diagram of a cross section of a backlight module according to a third embodiment of the present invention. The third embodiment differs from the second embodiment in that the reflective element 300 comprises a plate body 330 and a wall body 300'. The wall body 300' is located on the plate body 330, and can include the first walls 310 and the second walls 320 as described above. The plate body 330 can further have a plurality of accommodating holes 3300 arranged in arrays and respectively communicating with the plurality of reflective cavities 3000. The reflective element 300 is disposed on the light source module 200, and the light sources 210 can extend into the reflective cavity 3000 via the accommodating holes 3300. The third embodiment differs from the second embodiment further in that the positioning element 360 can be located under the plate body 330.

Figure 8:
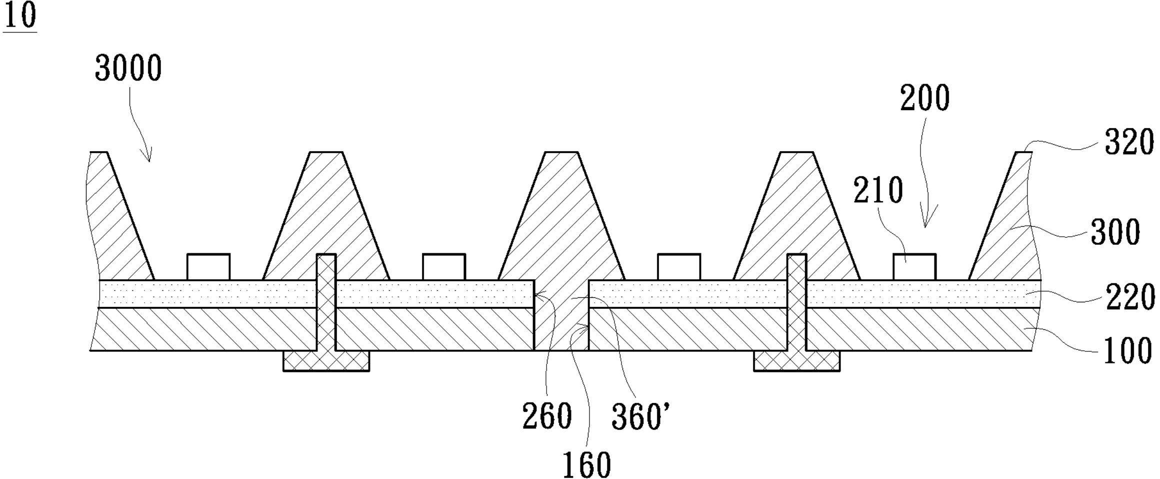
FIG. 8 is a schematic diagram of a cross section of a backlight module according to a fourth embodiment of the present invention.

FIG. 8 is a schematic diagram of a cross section of a backlight module according to a fourth embodiment of the present invention. The fourth embodiment differs from the second or third embodiment in that the backplate 100 comprises a plurality of second positioning portions 160, and the plurality of first positioning portions 260 of the light source module 200 respectively correspond to the plurality of second positioning portions 160, to determine the relative position between the light source module 200 and the backplate 100. In some embodiments of the present invention, the second positioning portion 160 can be, for example, a hole to be aligned with the first positioning portion 260 and then to fit with the pillar body of the positioning element 360', but the present invention is not limited thereto. In other embodiments, the positioning element 360, the first positioning portion 260, and the second positioning portion 160 can be in other types, for example, a recessed hole and a protruding bulge, which fit each other to implement positioning. The positioning element 360', the first positioning portion 260, and the second positioning portion 160 can be provided with the same quantity, and the quantity is preferably at least two.

Figure 9:
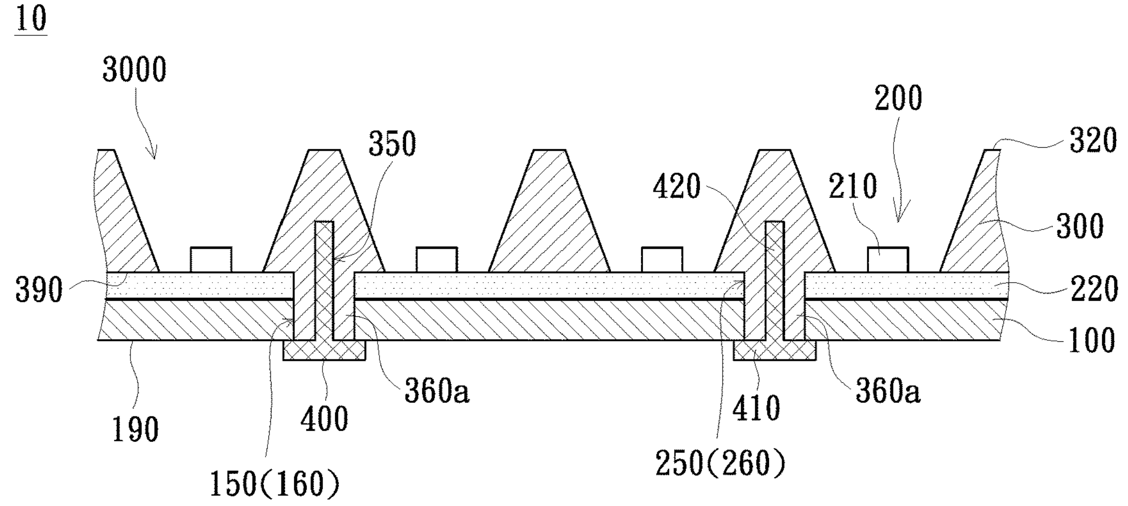
FIG. 9 is a schematic diagram of a cross section of a backlight module according to a fifth embodiment of the present invention.

FIG. 9 is a schematic diagram of a cross section of a backlight module according to a fifth embodiment of the present invention. The fifth embodiment mainly differs from the foregoing embodiments in that the reflective element 300 comprises a plurality of positioning elements **360*a*, and the third fixing holes 350 are formed in all or some of the positioning elements 360*a*. In other words, the positioning element 360*a* can be used for determining the relative position between the reflective element 300 and the light source module 200 and the backplate 100, so as to fix the reflective element 300 and the light source module 200 to the backplate 100. As shown in FIG. 9, in this embodiment, the second fixing hole 250 of the light source module 200 can serve as the first positioning portion 260, and the first fixing hole 150 of the backplate 100 can serve as the second positioning portion 160. In addition, some of the first fixing holes 150, some of the second fixing holes 250, and some of the third fixing holes 350 in this embodiment can be used only for fit with the fastener 400 and fixing. When the positioning portion is a hole, the fixing hole only used for fixing can be the same as or different from the positioning hole. For example, the first fixing hole 150 and the second fixing hole 250 serving as the positioning portions can fit the positioning element 360*a*, and the fixing hole only for fixing can be designed to fit the fastener 400. The fastener 400 fastens the backplate 100, the light source module 200, and the reflective element 300 from the bottom 190 of the backplate 100, and the connection portion 420 passes through the first fixing hole 150, the second fixing hole 250, the positioning element 360 and the third fixing hole 350 therein. The cap portion 410 can abut against the bottom 190 of the backplate 100 and limit the movement of the reflective element 300**.

Figure 10:
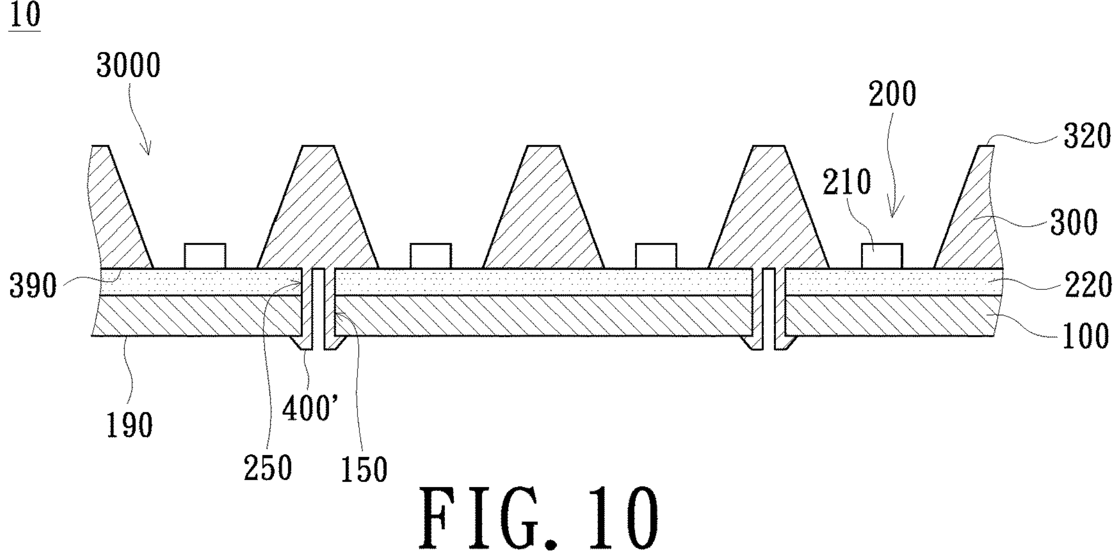
FIG. 10 is a schematic diagram of a cross section of a backlight module according to a sixth embodiment of the present invention.
Figure 11:
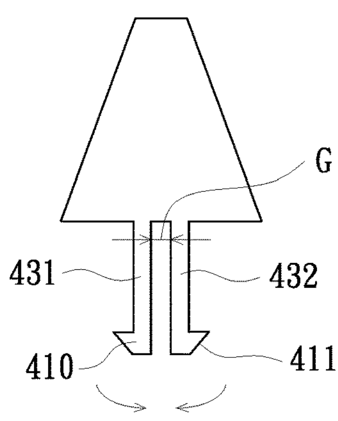
FIG. 11 is a locally enlarged view according to a sixth embodiment of the present invention.

FIG. 10 is a schematic diagram of a cross section of a backlight module according to a sixth embodiment of the present invention. The sixth embodiment mainly differs from the foregoing embodiments in that the plurality of fasteners 400' are formed at the bottom 390 of the reflective element 300. The fastener 400' preferably can pass through the second fixing hole 250 and the first fixing hole 150 and be fixed to the bottom 190 of the backplate 100. In some embodiments of the present invention, the fastener 400' is roughly of a pillar-shaped structure, for example, a pillar body formed integrally and extending from the bottom 390 of the reflective element 300. FIG. 11 is a locally enlarged view of the reflective element 300. As shown in FIG. 11, for example, the fastener 400' can comprise, for example, a first portion 431 and a second portion 432 that are half pillar-shaped. A gap G is present between the first portion 431 and the second portion 432, and the two portions can elastically approach each other. The cap portion 410 of the fastener 400' can have a guide surface 411. Based on the guide surface 411 and the elastic design, the fastener 400' preferably can pass through the second fixing hole 250 and the first fixing hole 150 and be fixed to the bottom 190 of the backplate 100. However, the shape of the fastener 400' is not limited to these shown in the embodiments of FIGS. 10 and 11.

Figure 12:
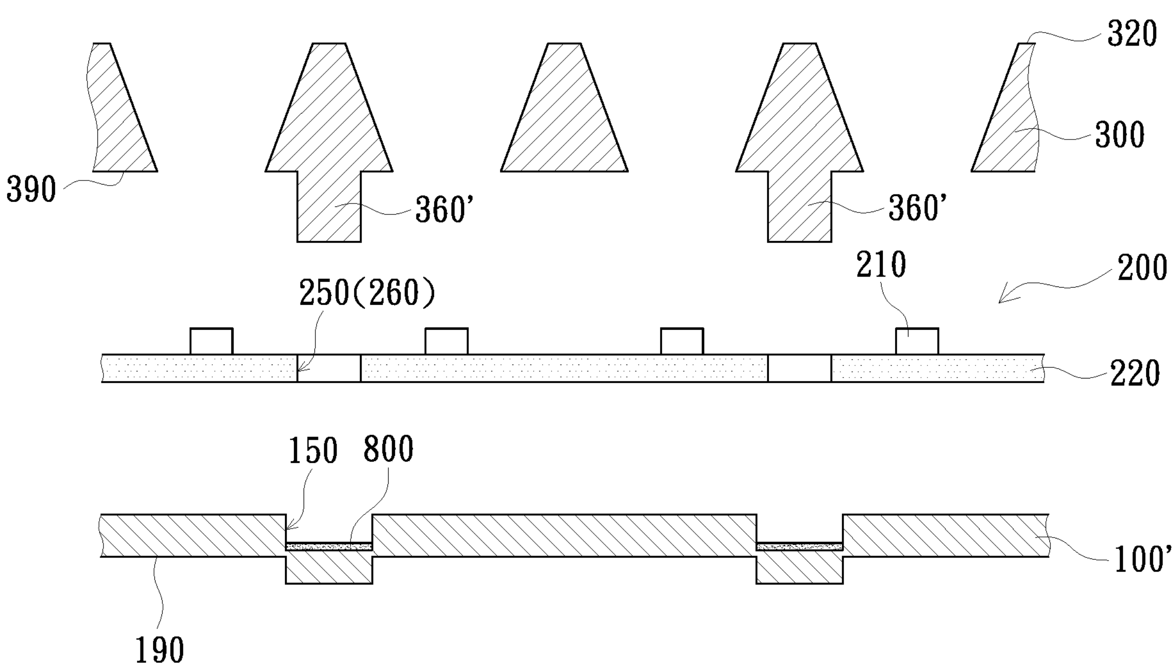
FIG. 12 is a schematic exploded view according to a seventh embodiment of the present invention.

FIG. 12 is a schematic diagram of a cross section of a backlight module according to a seventh embodiment of the present invention. As shown in FIG. 12, the reflective element 300 comprises the plurality of positioning elements 360', as in the fourth embodiment, corresponding to the plurality of first positioning portions 260 of the light source module 200. The first positioning portion 260 can be, for example, a hole, and the positioning element 360' can be, for example, a pillar body, the pillar body fitting with the hole. In addition, this embodiment is the same as the fifth embodiment in that the first positioning portion 260 can serve as the second fixing hole 250. This embodiment differs from the fourth and fifth embodiments in that the first fixing hole 150 of the backplate 100' is not a through hole. For example, the first fixing hole 150 can be a blind hole such as a recessed hole. The recessed hole can be formed through processes such as stamping and embossing. The present invention does not limit methods by which the recessed hole is formed. The first fixing hole 150 corresponds to and fits with the positioning element 360'. The blind hole can be used for accommodating an adhesive element 800, for example, for glue injection, to bond the positioning element 360', thus fixing the backplate 100', the reflective element 300, and the light source module 200.

In sum, in the embodiments of the present invention, the fasteners 400 or 400' enable fixing from the bottom 190 of the backplate 100, and thus do not cause interference between the light source module 200 and the reflective element 300. In addition, the fasteners 400 or 400' can fasten the backplate 100, the light source module 200, and the reflective element 300 together, thus reducing the assembly steps of the backlight module 10. For example, the step of disposing the glue to fix the reflective element 300, the light source module 200, and/or the reflective element 300 can be omitted, thus preventing insufficient adhesion force of the glue or the interference of the fastener from causing the components to fall off. Because the reflective element 300, the light source module 200, and the backplate 100 of the present invention are provided with the positioning structures, the reflective element 300 can be directly aligned with the light source module 200 and the backplate 100 for assembly. In other words, the reflective element 300, the light source module 200, and the backplate 100 of the embodiments of the present invention can be aligned and assembled without a jig. The backlight module 10 in the embodiments of the present invention overcomes the foregoing interference and falling problems, and therefore the reflective element 300 can be disposed flat and steadily on the light source module 200, and the correct relative position can be ensured among the reflective element 300, the light source module 200, and the backplate 100, increasing the production yield and improving light quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising a light source module, a reflective element, and a backplate, wherein the light source module is disposed on the backplate and comprises a plurality of light sources, a substrate, and a plurality of first positioning portions; wherein the plurality of light sources are arranged in arrays on the substrate, and the plurality of first positioning portions are configured on the substrate;

the reflective element is disposed on the light source module and has a plurality of reflective cavities; wherein:

the reflective element comprises a plurality of first walls, a plurality of second walls, and a plurality of positioning elements configured at a bottom; wherein the plurality of positioning elements respectively fit with the plurality of first positioning portions, and determine a relative position between the reflective element and the light source module;

the plurality of reflective cavities are arranged in arrays; and the plurality of light sources are respectively accommodated in the plurality of reflective cavities;

the backplate has a plurality of first fixing holes used for fixing the light source module and the reflective element to the backplate; and a plurality of fasteners;

wherein the light source module further comprises a plurality of second fixing holes, and the reflective element further comprises a plurality of third fixing holes formed at a bottom of the first walls, a bottom of the second walls, or a combination thereof, and the bottom of the first walls comprises a bottom surface, and the bottom of the second walls comprises a bottom surface, and the bottom surface of the first walls and the bottom surface of the second walls contact against the substrate of the light source module; wherein the plurality of third fixing holes respectively correspond to the plurality of second fixing holes, and the plurality of second fixing holes respectively correspond to the plurality of first fixing holes, and the plurality of fasteners respectively pass through each of the first fixing holes, each of the second fixing holes, and each of the third fixing holes and fix the light source module and the reflective element to the backplate.

2. The backlight module according to claim 1, wherein each of the fasteners comprises a cap portion and a connection portion, the connection portion extends from the cap portion to pass through each of the first fixing holes and each of the second fixing holes, and the cap portion abuts against a bottom of the backplate.

3. The backlight module according to claim 1, wherein the plurality of fasteners are formed at a bottom of the reflective element.

4. The backlight module according to claim 1, wherein the backplate comprises a plurality of second positioning portions, and the plurality of first positioning portions respectively correspond to the plurality of second positioning portions, and determine a relative position between the light source module and the backplate.

5. The backlight module according to claim 4, wherein the positioning element comprises a pillar body, the first positioning portion and the second positioning portion respectively have a hole, and the pillar body passes through the hole of the first positioning portion and the hole of the second positioning portion.

6. The backlight module according to claim 1, wherein the plurality of first positioning portions respectively correspond to all or some of the first fixing holes, and determine a relative position between the light source module and the backplate.

7. The backlight module according to claim 1, wherein the plurality of first fixing holes are blind holes, and the plurality of blind holes are adapted to respectively accommodating a plurality of adhesive elements; and the positioning element comprises a pillar body, the first positioning portion has a hole, and the pillar body passes through the hole of the first positioning portion and extends into the first fixing hole, wherein the adhesive element is connected to the pillar body and the backplate.

8. The backlight module according to claim 1, wherein the plurality of first walls extend in a first direction and are spaced apart in a second direction, and the plurality of second walls extend in the second direction and are spaced apart in the first direction, and the first direction is perpendicular to the second direction.

9. The backlight module according to claim 1, wherein at least one surface is provided around each reflective cavity, and each of the light sources is provided with at least one light-emitting surface facing the at least one surface.

10. The backlight module according to claim 1, further comprising a reflection sheet disposed between the reflective element and the light source module and having a plurality of through holes and a plurality of passing holes, wherein the plurality of through holes respectively correspond to the plurality of second fixing holes and are adapted for the plurality of fasteners to pass through, the plurality of passing holes respectively correspond to all or some of the light sources, and all or some of the light sources respectively pass through the plurality of passing holes.

11. The backlight module according to claim 1, further comprising a reflection sheet disposed between the reflective element and the light source module and having a plurality of through holes and a plurality of passing holes, wherein the plurality of through holes respectively correspond to all or some of the positioning elements, and all or some of the positioning elements pass through the plurality of through holes, the plurality of passing holes respectively correspond to all or some of the light sources, and all or some of the light sources respectively pass through the plurality of passing holes.

12. The backlight module according to claim 1, further comprising a reflection sheet disposed between the reflective element and the light source module, wherein the reflection sheet has a plurality of through holes and a plurality of passing holes, and comprises a sheet material region and a hollow region; and the sheet material region surrounds the hollow region, and the plurality of through holes and the plurality of passing holes are formed in the sheet material region.

* * * * *